Sept. 23, 1969 A. G. MILLER ET AL 3,468,741

APPARATUS FOR APPLYING EDGING TAPE TO THE EDGE OF A WORKPIECE

Filed Jan. 28, 1966 4 Sheets-Sheet 1

INVENTORS
ALFRED G. MILLER
SAMUEL M. LO DOLCE

BY

Kane, Dalsimer, Kane + Smith
ATTORNEYS

APPARATUS FOR APPLYING EDGING TAPE TO THE EDGE OF A WORKPIECE

Filed Jan. 28, 1966 4 Sheets-Sheet 2

INVENTORS
ALFRED G MILLER
SAMUEL M. LO DOLCE
BY
Kane, Dalsimer, Kane & Smith
ATTORNEYS

APPARATUS FOR APPLYING EDGING TAPE TO THE EDGE OF A WORKPIECE

Filed Jan. 28, 1966 4 Sheets-Sheet 3

INVENTORS
ALFRED G. MILLER
SAMUEL M. LO DOLCE
BY
Kane, Dalsimer, Kane & Smith
ATTORNEYS

APPARATUS FOR APPLYING EDGING TAPE TO THE EDGE OF A WORKPIECE

INVENTORS
ALFRED G. MILLER
SAMUEL M LO DOLCE
BY
Kane, Dalsimer, Kane & Smith
ATTORNEYS United States Patent Office 3,468,741
Patented Sept. 23, 1969

3,468,741
APPARATUS FOR APPLYING EDGING TAPE TO THE EDGE OF A WORKPIECE
Alfred G. Miller, Maywood, and Samuel M. Lo Dolce, Rochelle Park, N.J., assignors to Potdevin Machine Co., Teterboro, N.J., a corporation of New York
Filed Jan. 28, 1966, Ser. No. 523,698
Int. Cl. B65c 9/04
U.S. Cl. 156—446 5 Claims

ABSTRACT OF THE DISCLOSURE

An apparatus is provided for applying edging tape to the edge of a product to be edge laminated. This product is suitably clamped for rotation by means of an air operated clamping device. Plastic edging tape is supplied from a roll and passes through a gluing machine designed to ply adhesive to one of the side faces of the tape web. The tape web is suitably guided and fed from the gluing station with the rotation of the clamped product and movement and application of the tape web to the product edge being synchronized. The tape web is cut at a suitable location to assure the application of the desired amount of tape to the edge of the product.

The present invention relates generally to the application of tape edging and, more particularly, to an improved method and apparatus for applying tape to the edges of structural members such as shelving, doors, tabletops and the like for altering or enhancing the aesthetic appearance of the edges of such members.

At present, free-hand techniques are employed for applying self-edging tape to such structural members as cabinet doors, shelving, tabletops and the like ordinarily for purposes of upgrading the appearance of otherwise low-grade lumber, plywood or similar stock. However, the present tape applying method leave much to be desired. The typical application involves laying the tape manually over the edges of the structural member in somewhat limp fashion; and the tape is then smoothed down as much as possible by hand to cause adherence of the tape to the edge by means of interposed adhesive. The resultant product is inevitably an irregular laminated structure in that the degree of adhesion is a variable throughout the edge with some spots holding well and others not at all such as the tendency of the marginal edges of the tape to lift as is usually the case with the tape trailing edge. Obviously, construction of this type creates many delamination problems which, in effect, defeat the primary purpose of the tape edging of enhancing the aesthetics of the product to be edge laminated.

It is, therefore, a principal object of this invention to eliminate the disadvantages of the prior art techniques by providing both apparatus and an improved technique for applying the tape edging whereby the tapes are stressed during application and delamination is dramatically reduced.

Another object is to provide for the automatic introduction of tensioning pull to the tapes as they are being applied to not only only keep the tapes smartly in place but to add a safety factor in assuring the desired finished appearance of the product by enabling the tapes to be laid down more evenly with a smoother finished appearance and with a more uniform application of interposed adhesive.

A further object is to improve the application of tape edging in such manner and by such apparatus whereby less tape is used with the tendency of the tapes to "creep" back if unduly stretched being contained if not totally eliminated by the application of a securing means to the overlapped leading and trailing edges of the tape in a manner that lends itself to modern day mass production stapling gun techniques which are fast, efficient and hardly noticeable and which can be performed while the piece being edged is still held in place in the machine constructed in accordance with this invention thereby eliminating right at the outset the tendency of the overlapped ends to fray, pick-up or otherwise separate at this location.

Briefly stated, the present invention contemplates feeding a web of plastic edging tape from a roll through a gluing machine designed to apply adhesive to one of the side faces of the plastic web. The web is suitably guided to the applicator roller of the gluing machine and then is led outwardly through a pair of feed rollers in turn driven by the movement of the web. A drive connection between the applicator roll and the feed rollers serves to rotate the applicator roll in synchronization with the rotation of the feed rollers and, consequently, the movement of the tape web. At a location intermediate the feed rollers and applicator roll, a scissor-type knife is incorporated and is adapted to be advantageously operated to cut the tape web at the desired location.

An air operated clamping device is adapted to selectively hold the product to be edge laminated in a manner that the product is adapted to be rotated as the operator pulls the leading end of the web of tape and simultaneously apply it to the edge of the product. In order to facilitate the application of the web, the operator may employ a hand gauge and manipulate a pressure roller for pressing the plastic tape to the edge. As indicated in the above, as the operator pulls the web, the correct amount of adhesive is automatically applied thereto. When the desired amount of tape has been applied to the edge of the product, the web is cut by the scissors associated with the gluing machine and then subsequently trimmed by the operator to provide for an overlap splice of the leading and trailing ends of the tape web. A staple or other suitable securing means may then be applied to interconnect the overlapped ends to eliminate "creep" and prevent delamination at this location.

Other objects and advantages will become apparent from the following detailed description which is to be taken in conjunction with the accompanying drawings illustrating a somewhat preferred embodiment of the invention and in which.

Figure 1:
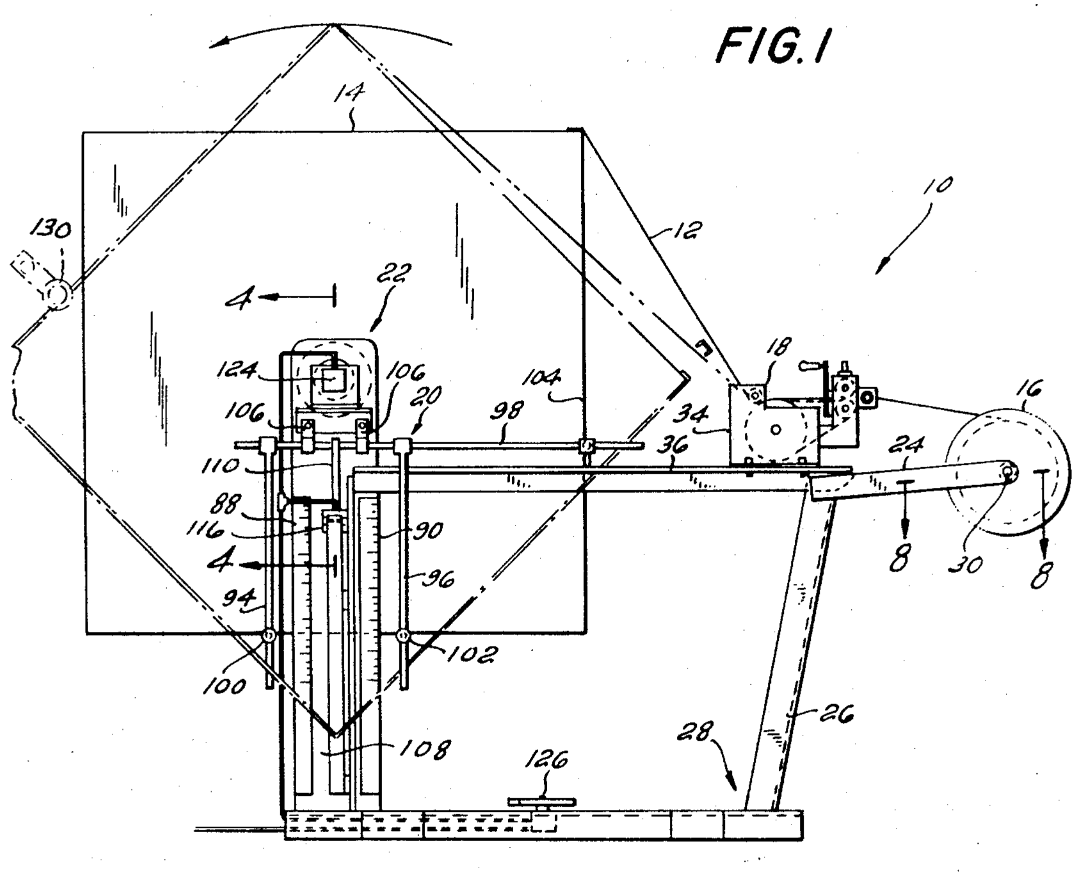
FIG. 1 is a side elevational view of apparatus in accordance with this invention for applying plastic tape edging to a wide variety of products such as the illustrated cabinet door.
Figure 2:
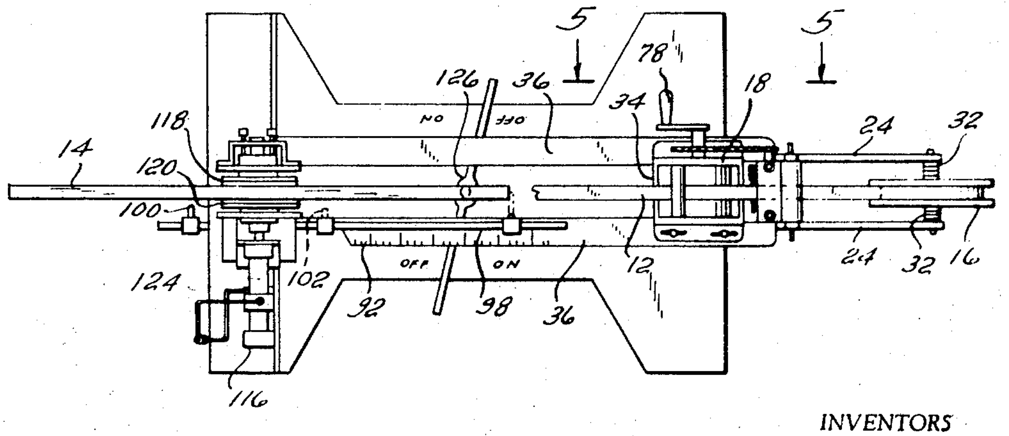
FIG. 2 is a top plan view thereof.
Figure 3:
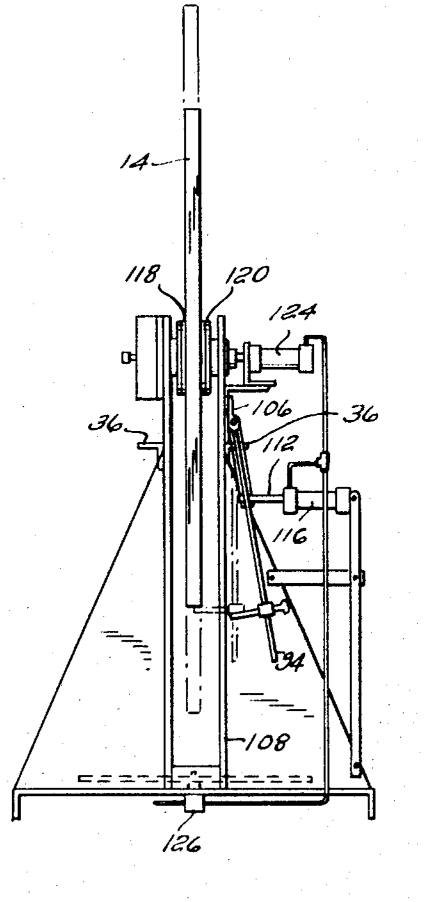
FIG. 3 is a front end elevational view thereof.
Figure 8:
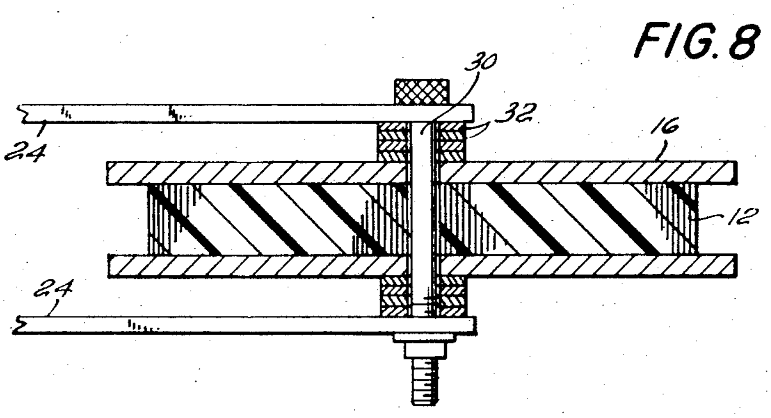
FIG. 8 is an enlarged sectional view taken along the line 8—8 of FIG. 1 showing the relatively simple and expedient manner in which reels of different width tapes are accommodated by the edging application apparatus of this invention.

In the drawings, a tape edging application apparatus 10 is illustrated and is peculiarly adapted to have the web 12 of the selected tape applied to the edge of one of a variety of products such as the exemplary cabinet door 14. Basically, the apparatus 10 includes a tape supply reel 16, gluing unit 18, a door centering assembly 20 and a door clamping device 22.

Referring initially to the tape supply reel 16, it will be observed that the reel is pivotally supported by a pair of arms 24 extending laterally from the upright standard 26 of the apparatus frame 28. The reel is rotatably mounted on pin 30 extending between the free ends of the arms 24. A suitable number of filler washers 32 may be employed to center the reel 16 between the arms 24 and, at the same time, render it extremely convenient to accommodate different widths of reel 16 as well as tape webs 12. Thus, when a reel 16 is required to be replaced or replenished, it may simply be removed by unscrewing the pin 30 and replace this exhausted reel with a fresh reel of tape. Naturally, the tape material selected for the laminating process may be selected from a wide variety of materials depending upon the decorative and visual effects desired for the edging of the door 14. Materials found to work exceptionally well for a large number of the desired and contemplated applications fall within the vinyl resin family and are available commercially today.

Referring now the gluing unit 18, it will be recalled that this unit advantageously applies an even coating of the selected adhesive to one face of the web of tape 12 and also includes a cutting implement for cutting the web when the desired length of tape has been applied to the edge of the door 14. Towards this end, the unit 18 includes a paste pot 34 anchored to the angle iron horizontal supporting table 36 forming part of the frame 28. The glue 38 in the pot 34 is maintained at an acceptable level for assuring the desired amount of glue on the periphery of the applicator roll 40 which is keyed to shaft 42 which also has keyed thereto a pulley 44 and exteriorly mounted crank arm 46. With this arrangement, movement of the leading end of the web 12 is facilitated when it is desired to initiate another edging cycle of operation. The applicator roll 40 is drivably connected with a feed roller 48 which is keyed to shaft 50 and rotatable with pulley 52 by means of the interconnecting belt 54. The shaft 50 is journaled between a pair of spaced upstanding brackets 56 which also cooperate in mounting a vertically adjustable spring biased pressure roll 58. In this connection, the ends of the shaft 60 to which the roller 58 is keyed, are journaled in sliding blocks 62. A compression spring 64 is suitably arranged to develop the necessary pressure of the roll 58 against the web 12 traveling between this roll and roll 48. In order to adjust this pressure, a pair of adjusting screws 66 are provided. The web 12 of the tape is suitably guided to the pressure rollers 48 and 58 by a guide arrangement including a pair of adjustable and spaced blocks 68 slidable in the opening 70. Each block 68 is coupled with the inner end of an adjustment screw 72 by means of a universal or equivalent type of connection with the other end of the screw containing a knurled head to facilitate turning of the screw and consequent sliding movement of the associated block 68. An interposed spring 74 biases the associated block 68 within the opening 70 to maintain the desired and selected guide path for the web 12. A cutting element in the form of scissors operates to cut the web 12 when the desired length of tape has been applied to the edge of the door 14. The scissors includes a pivotal cutting blade 76 having a readily graspable handle 78 and the cooperating fixed blade 80. The pivotal blade 78 is biased upwardly and away from the fixed blade 80 by means of spring 82. When it is desired to sever the web 12, the handle 78 need only be grasped and the blade 76 pivoted downwardly against the bias of the spring 82 to cooperate with the fixed blade 80 in cutting the web 12. As the web leaves the cutting station, it passes through a guide member 84 over the periphery of the applicator roll 40 and around roller 86 which cooperates with the applicator roller 40 in assuring adequate contact of the web 12 with the periphery of the applicator roll 40.

Although the particular embodiment being discussed herein described as being a cabinet door 14, it should be understood that other members which require edging are contemplated by the present invention. In addition, it should be appreciated that the width of the tape applied for edging may correspond with the thickness of the particular workpiece 14 or be smaller to provide for the desired visual effects. Furthermore, the workpiece 14 may not only be square but rectangular as well and many even be round or oval or have a periphery that is partly straight and partly arcuate in configuration.

Figure 4:
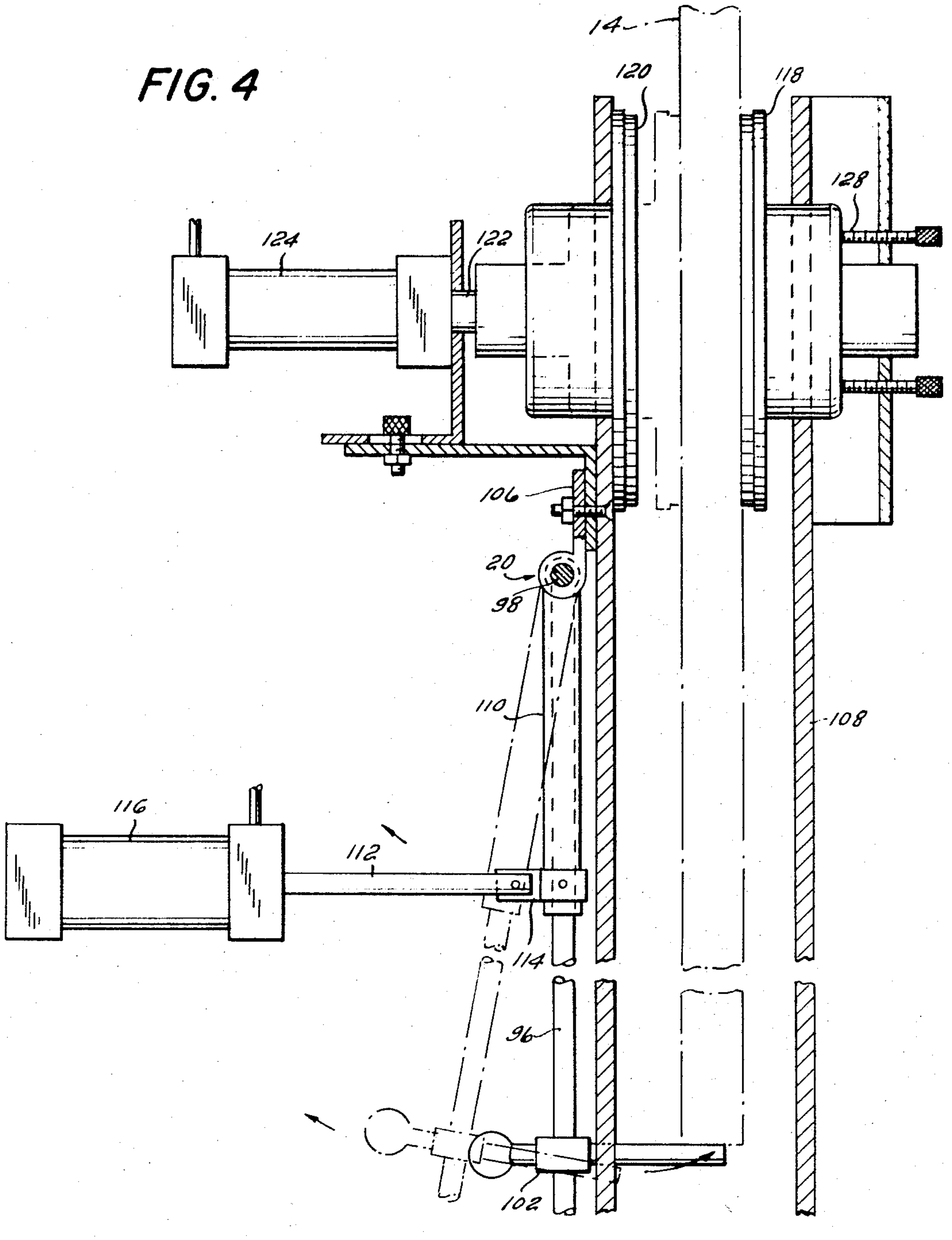
FIG. 4 is an enlarged fragmentary sectional view taken along the line 4—4 of FIG. 1.
Figure 5:
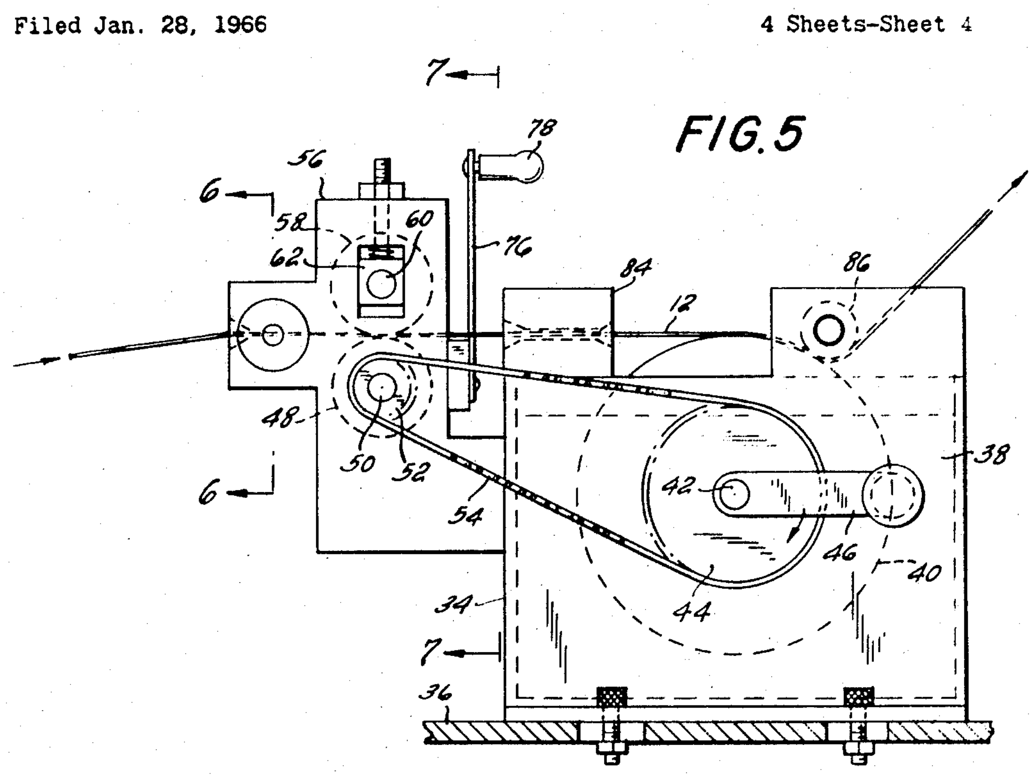
FIG. 5 is an enlarged side elevational view of the gluing unit forming part of the edging applciation apparatus with certain parts broken and removed and others sectioned.
Figure 6:
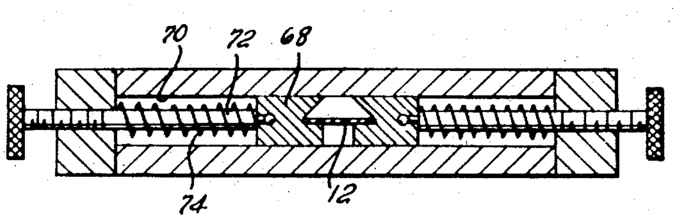
FIG. 6 is a sectional view taken along the line 6—6 of FIG. 5 showing the elements which cooperate with one another to accommodate different widths of tape.
Figure 7:
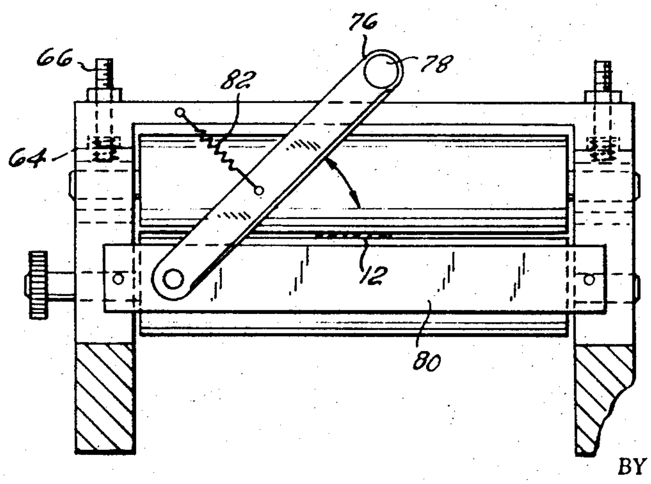
FIG. 7 is a sectional view taken along the line 7—7 of FIG. 5 illustrating the station at which the web of tape is cut following the application of the desired amount of tape to the edge of the door.

It is preferred to have the door or other selected workpiece 14 centered with respect to the axis of rotation about the clamping unit 22 to minimize the creation of any undesirable torques and an eccentric form of rotation of the workpiece 14 during the application of the tape web 12. Towards this end, the centering assembly 20 is provided with a pair of vertically extending scales 88 and 90 together with a horizontal scale 92 which are calibrated to give the distance from the center of rotation as defined by the clamping unit 22. Each scale has associated therewith a parallel extending rod 94, 96 and 98, respectively, substantially as shown with the upper end of the rods 94 and 96 fixed to the rod 98. Adjustable gauge pins 100, 102, and 104 are adjustably and slidably secured to the respective rods 94, 96 and 98. Thus, by knowing the precise or approximate dimensioning of the door 14, the gauge pins need only be set on their associated rod by referral to the neighboring scale such that the door will be mounted in a substantially balanced condition so that when the clamping unit 22 is actuated the workpiece will be substantially centrally mounted. The centering assembly 20 includes a pivotal connection whereby once the clamping unit 22 is actuated to securely hold the workpiece 14, the centering assembly will be retracted to permit the desired rotation of the workpiece 14. In this connection, the rod 98 is journaled by means of the brackets 106 extending from the vertical post 108 of the frame 28. To automatically obtain the pivotal action of the centering assembly 20, a rod 110 is keyed to the rod 98 and is pivotally coupled with the free end of piston rod 112 through an interposed pivotal yoke 114. Under the circumstances, retraction of the piston rod 112 incident to the retraction of the piston in the cylinder 116 will cause counterclockwise movement of the centering assembly 20, as viewed in FIG. 4, to thereby clear the guide pins 100, 102 and 104 from the workpiece now retained by the clamping unit 22.

Thus, it is preferred that the clamping unit 22 be actuated simultaneously with the actuation of the centering assembly 20 or even slightly prior in time. Accordingly, the clamping unit 22 is provided with a rotatable but axially stationary clamping jaw 118 and a rotatable as well as axially shiftable clamping jaw 120. Both jaws are suitaby journaled by means of the vertical split post 108. The axially shiftable jaw 120 is connected with the free end of the piston rod 122 the other end of which is coupled with a piston shiftable in the cylinder 124. Thus, by connecting the fluid cylinders 116 and 124 to a suitable source of fluid under pressure and connecting them in tandem by a single valve 126 when opened will communicate the rear face of the piston in cylinder 124 with the fluid under pressure and simultaneously communicate the front face of the piston in cylinder 116 with the fluid under pressure. Accordingly, the shiftable clamp 120 will be forced towards the stationary clamp 118 to clamp the workpiece 14 therebetween and simultaneously retract the centering assembly 20 to free the workpiece from the guide pins 100, 102 and 104. When the valve 126 is closed, the pistons within the cylinders 116 and 124 will be shifted to their original positions either hydraulically or by means of a contained spring usually found in single acting piston-cylinder constructions. In this manner, the workpiece 14 having the tape edging completely and adequately applied thereto may be removed and a fresh workpiece inserted. Naturally, once the centering assembly 20 has been set, workpieces of similar dimensions need only be mounted and placed into engagement with the gauge pins 100, 102 and 104 without requiring further adjustment.

Following the cutting of the web 12 by the actuation of the scissors shiftable blade 76, the applied tape web 12 need only be manually trimmed to the satisfaction of the operator. While the finished workpiece is properly mounted in the apparatus 10, the operator may at this time apply a staple to the overlapping leading and trailing edges of the tape to secure this overlap relationship and minimize, if not eliminate, the tendency of the tape to creep as a result of the tensioning thereof during the application process. As will be appreciated, this tensioning or pulling of the web 12 is created when the workpiece 14 is rotated about the clamping jaws 118 and 120 and the resistance offered the travel of the web 12 by the pressure rollers 48 and 58. In order to minimize the danger of the workpiece 14 from rotating too fast or perhaps rotating backwards or even running away from the control of the operator, a relatively simply braking system may be incorporated in which a pair of adjustable screws 128 are adapted to be threaded into engagement with surfaces of the rotatable but axially immovable clamping jaw 118. The degree of friction created may be adjusted to suit the operator to obtain the desired degree of controllable rotation of the workpiece 14.

To summarize the next cycle of operation, the selected workpiece 14 is properly mounted and centered by means of the gauge pins 100, 102 and 104 of the centering assembly 20. Thereafter, the valve 126 is tripped to cause the simultaneous shifting of the movable jaw 120 of the clamping unit 22 forwardly into engagement with the workpiece 14 to thereby secure the workpiece between both jaws of the clamping unit 22. At the same time, the gauge pins 100, 102 and 104 will be pivoted away from the workpiece 14. Now the leading end of the web 12 of the selected tape is preferably applied to a corner of the workpiece 14, substantially as shown in FIG. 1. As the operator continues pulling the web 12 and the workpiece 14 is manually turned, the tape will be applied to the four edges. Where desired or necessary, the operator may employ hand gauges and pressure rollers 130 of the type diagrammatically illustrated in FIG. 1 to assure the proper location and pressurization of the web 12 on all four edges. Thereafter, the shiftable blade 76 is actuated to sever the web 12 and the operator will thereafter perform the desired manual trimming of the excess tape. Following this operation, the operator may now apply a staple to secure the overlapping leading and trailing ends of the tape. This staple may be of a matching color and may be applied by a conveniently located stapling gun according to modern day mass production methods. Now the workpiece 14 which has been completely edged may be removed by simply reversing the valve 126 to cause the clamping unit 22 to open and the centering assembly 20 to resume its supporting position. The finished workpiece 14 may now be removed and the apparatus 10 is ready for the start of another cycle of operation.

We claim:

1. Apparatus for applying edging tape to the edge of a workpiece comprising:

a frame;

reel means supported by the frame for supporting a tape reel and supplying a web of the tape;

clamping means supported by the frame for clamping for rotation of the workpiece;

a gluing unit supported by the frame for supplying and applying adhesive to one side face of the web tape;

guide means associated with the gluing unit for guiding the web of the tape through the gluing unit onto the workpiece;

whereby the workpiece is adapted to be rotated and the web with adhesive applied to the edge of the workpiece with the rotation of the workpiece and movement and application of the web of tape to the edge of the workpiece being synchronized; and said gluing unit including a paste pot to hold a quantity of glue, an applicator roll adapted to be partly immersed in the glue in said pot, means for rotatably mounting the applicator roll with said guide means guiding the web of tape over and in engagement with the exposed periphery of the applicator roll, pressure roller means for controlling the feeding of the web of tape through the gluing unit from the reel means to the workpiece with said guide means guiding the web of tape to and from the pressure roller means.

2. The invention in accordance with claim 1 wherein said reel means includes means for accepting reels of tape of different sizes.

3. The invention in accordance with claim 1 wherein cutting means are associated with the gluing unit for cutting the web of tape at a predetermined location.

4. The invention in accordance with claim 1 wherein said clamping means includes a stationary jaw rotatably mounted, by the frame and a longitudinally shiftable jaw rotatably mounted by said frame and being shiftable from a first position at which it is adapted to cooperate with the stationary jaw to clamp the workpiece therebetween to a second position at which the workpiece is released.

5. An apparatus for applying edging tape to the edge of a workpiece comprising:

a frame;

reel means supported by the frame for supporting a tape reel and supplying a web of the tape;

clamping means supported by the frame for clamping for rotation of the workpiece;

a gluing unit supported by the frame for supplying and applying adhesive to one side face of the web of tape;

guide means associated with the gluing unit for guiding the web of the tape through the gluing unit onto the workpiece;

whereby the workpiece is adapted to be rotated and the web with adhesive applied to the edge of the workpiece with the rotation of the workpiece and movement and application of the web of tape to the edge of the workpiece being synchronized; and a workpiece centering assembly being on said frame and including adjustable gauging means for centering the workpiece relative to the clamping means.

References Cited

UNITED STATES PATENTS

| | | | |
|---|---|---|---|
| 2,625,197 | 1/1953 | Chamberlain | 156—446 |
| 1,871,718 | 8/1932 | McNeil et al. | 156—549 |
| 3,076,493 | 2/1963 | Berg | 156—446 |
| 2,748,046 | 5/1956 | Works et al. | |
| 2,813,506 | 11/1957 | Johnston | 156—549 XR |

EARL M. BERGERT, Primary Examiner

PHILIP DIER, Assistant Examiner

U.S. Cl. X.R.

156—185, 468, 486, 522, 578